Feb. 6, 1940.   W. J. RYAN   2,189,226
BRAKE
Filed Jan. 11, 1937   5 Sheets-Sheet 1

INVENTOR
WILLIAM J. RYAN
BY  M. W. McConkey
ATTORNEY

Feb. 6, 1940. W. J. RYAN 2,189,226
BRAKE
Filed Jan. 11, 1937 5 Sheets-Sheet 2

INVENTOR
WILLIAM J. RYAN
BY
ATTORNEY

Feb. 6, 1940.  W. J. RYAN  2,189,226
BRAKE
Filed Jan. 11, 1937   5 Sheets-Sheet 5

INVENTOR
WILLIAM J. RYAN
BY
ATTORNEY

Patented Feb. 6, 1940

2,189,226

UNITED STATES PATENT OFFICE 2,189,226

BRAKE

William J. Ryan, South Bend, Ind., assignor to Bendix Products Corporation, South Bend, Ind., a corporation of Indiana Application January 11, 1937, Serial No. 119,927

19 Claims. (Cl. 188—79.5)

This invention relates to brakes and is illustrated as embodied in internal expanding shoe brakes for automobiles.

One of the objects of this invention is to provide simple and effective means for adjusting brakes to compensate for shoe wear. In illustrating my invention I have shown means for adjusting the return position of the shoes so that the clearance between the shoes and the drums is maintained constant. I have provided means for automatically making this adjustment so that the constant clearance is automatically maintained. I have also provided means for lengthening the effective lengths of the shoes, in combination with means for adjusting the return position, so that not only is the proper clearance maintained, but also adjustment is effectively made to the applying means.

According to a very important feature of this invention these adjustments are preferably made with relation to the braking surface of the drum, so that they are not affected by expansion and contraction of the drum due to heat and pressure.

A further object of my invention is the provision, in combination with brakes of the character discussed above and having adjustments such as those discussed above, of means for preventing the over-adjustment of the brakes from other causes than shoe wear, such as for instance expansion of the drum due to heat. As one effective means of controlling the adjustment, I have shown in several embodiments a drum contact member which is operated by movement of the shoe toward drum contact when the shoe is worn to operate an automatic adjustment for the brake.

A further object of the invention is the provision in a servo brake of the type which shifts its anchorage in forward and reverse braking, of means for distributing more uniformly the braking pressures on the primary and secondary shoes of said brake. To this end, the anchoring torque of the primary shoe in forward braking may be transmitted to the secondary shoe as an applying force with decreased force, and the anchoring torque of the secondary shoe in reversed braking transmitted as an applying force to the primary shoe with decreased power. Thus the braking force of the two shoes is more nearly equalized, better braking may be obtained and longer life of the brake as a whole is possible.

A further object is the provision, in an arrangement such as that just discussed, of means for automatically adjusting such a brake to compensate for lining wear and of means for preventing over-adjustment when the drum expands due to heat.

One feature of the invention is the provision of drum contact members which cooperate with return stops so as to maintain a constant clearance between the shoes and the drum.

A further feature of the invention is the provision of cams of such design and shape as efficiently to accomplish the desired purposes.

A further feature of the invention relates to a cam formed with teeth and provided with a spring so arranged that the spring forms the double function of tending to turn the cam and at the same time holds the cam in teeth-engaging position so as to prevent the turning of the cam except when the teeth are disengaged by some other means.

A further feature of the invention has to do with a pair of levers one of which is pivoted on the other and so arranged as to transmit anchoring torque as a lesser force from one shoe to another so as to apply both shoes more uniformly.

Further features and objects of the invention will be apparent from a reading of the subjoined specification and claims and from a consideration of the accompanying drawings, in which:

Figure 1:
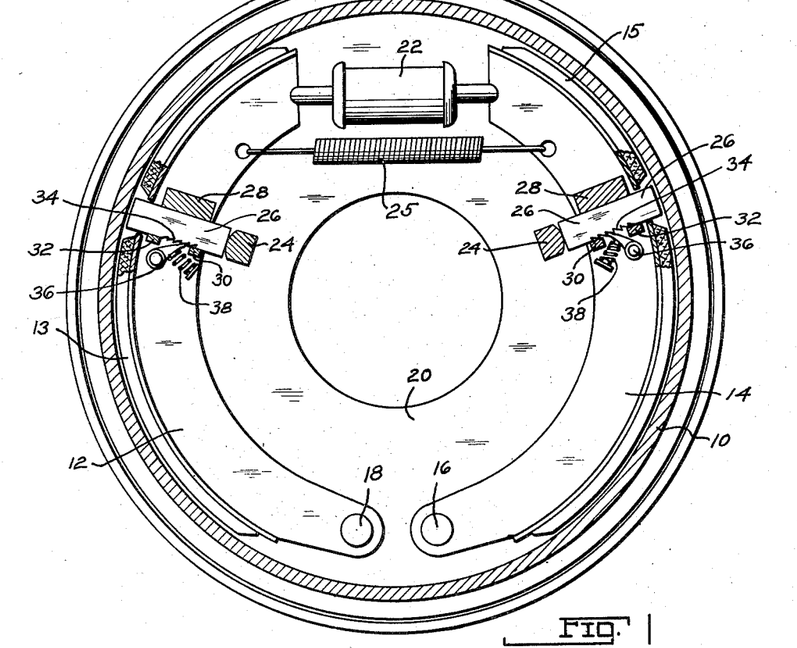
Figure 1 is a view in vertical section, just inside the head of the brake drum, of a brake constructed according to one embodiment of the invention.

Referring in detail to the drawings, it may be seen that I have shown in Figure 1 a brake drum 10 arranged to cooperate with brake shoes 12 and 14 mounted by means of anchor pins 16 and 18 on a backing plate 20. A hydraulic wheel cylinder actuator 22 is provided for moving the shoes into drum contact. Cooperating with the shoes 12 and 14 are return stops 24, with each of which a slidable bar 26 is arranged to contact in the released position of the brake to maintain the proper clearance between the shoes and the brake. Each bar 26 is arranged to slide in a guideway formed by lugs 28, 30, and 32 secured to its associated shoe. If it is not desired to rely on the friction of the ports to hold the bar 26, it may be provided with means such as teeth 34 which cooperate with a pawl 36 or the like urged against said teeth by a spring 38.

It will be seen that when brake-applying pressure is relieved from the actuator 22 the spring 25 will return the shoes 12 and 14 from drum contact. The amount of the return will be governed by the contact of the bars 26 with the stops 24. So long as there is no wear on the lining of the shoes 12 and 14, the pawls 36 hold the bars 26 in the same positions relative to its associated shoes, inasmuch as the bars 26 contact the drum at the same time as the shoes. However, when the lining of either shoe wears, the outer end of its bar 26 contacts the drum before the lining does and the bar 26 is moved inward so that the pawl 36 engages another tooth. Thereafter, when the brake is released, the inner end of the bar 26 contacts the stop 24 before the associated shoe has moved inward as far and the same relative clearance is maintained.

Figure 2:
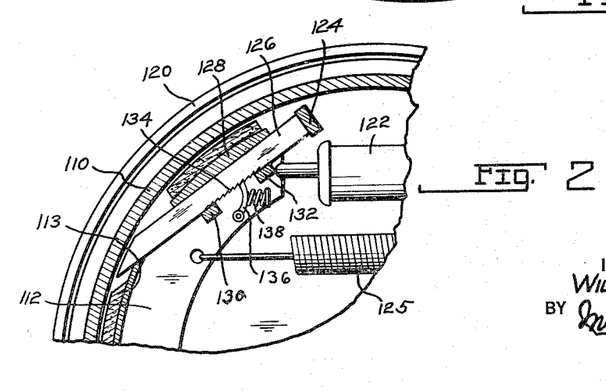
Figure 2 is a fragmentary view in section corresponding to a portion of Figure 1 and illustrating another embodiment of my invention.

Referring to Figure 2, it will be seen that the bar 126, instead of being arranged to slide radially, is arranged to slide substantially along a chord of the brake drum within guides 128, 130 and 132. Thus the teeth 134 cooperate with the pawl 136 to produce a finer adjustment. Moreover, the position of the return stop 124 lessens the effect of the spring 125 on the return stop mechanism 124, 126, 136. Moreover, the angle of the contact between the bar 126 and the drum 110 allows a compensation for possible wear on the end of the bar 126.

Figure 3:
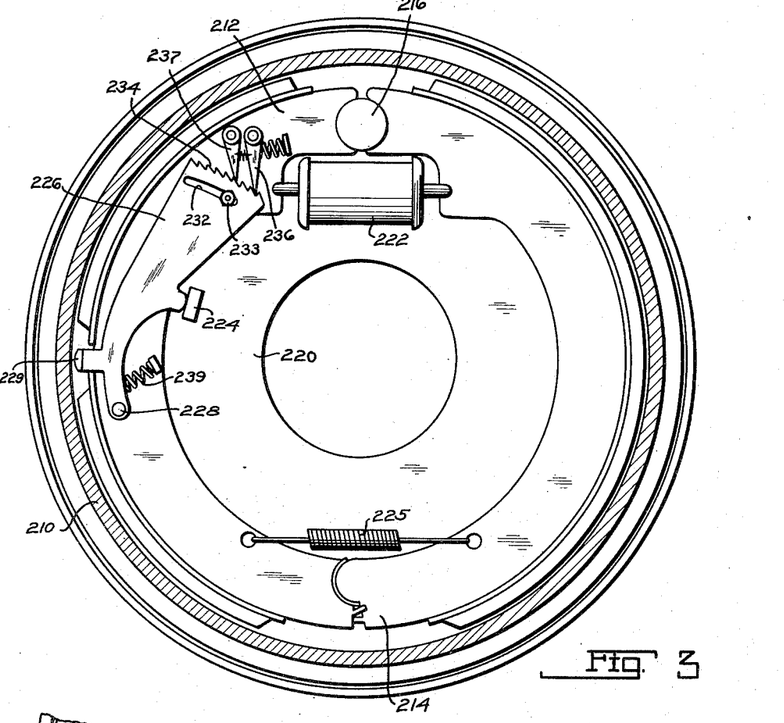
Figure 3 is a view in section corresponding somewhat to Figure 1 showing a brake of the servo type which is constructed according to another embodiment of my invention.

In Figure 3 I have shown a drum 210 provided with shoes 212 and 214 both arranged to anchor through the shoe 214 upon the anchor 216 when braking in a forward direction and through the shoe 212 on the anchor 216 when braking in a rearward direction. The anchor 216 is secured to the backing plate 220 to which there is also secured the applying cylinder 222. The shoes are returned from drum contact by means of springs such as springs 225, only one being shown but any desired number being provided. Return stops 224 are provided with which levers such as 226, on opposite sides of the shoe, are arranged to contact.

The levers 226 are pivoted as at 228 on the associated shoe and are provided with lugs 229 arranged to contact with the drum when the brake is being applied. The levers are formed with teeth 234 which cooperate with pawls 236 and 237. A spring 239 is provided which tends to hold the teeth 234 in contact with one of the pawls 236 and 237 so as to prevent undesired movement of the lever 226. By the provision of the two pawls an adjustment is possible one-half as large as would be possible with only one pawl. The lever 226 is provided with a guide slot 232 through which there protrudes a bolt 233 secured to the associated shoe.

It will be seen that the lever 226 thus determines the return position of the shoe and that as the lining wears the drum contacting with the lug 229 will move the lever 226 to adjust the return position of the shoe to maintain proper lining clearance.

Figure 4:
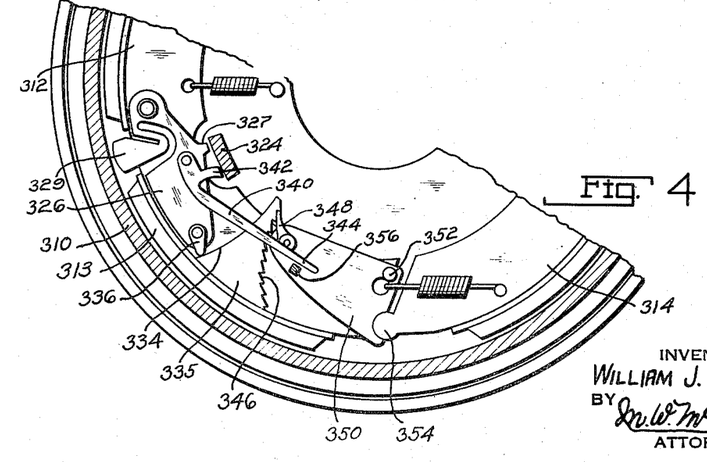
Figure 4 is a fragmentary sectional view corresponding to a portion of Figure 3 and showing another embodiment of my invention.

In the arrangement shown in Figure 4 there is a drum 310 with which there are associated shoes 312 and 314. These shoes are of the servo type shown in Figure 3. Not only is means provided for adjusting the return position of the shoes so as to maintain a constant lining clearance, but also means is provided to increase the effective length of the shoes so that no adjustment of the applying means becomes necessary. Pivoted on the primary shoe 312 is a lever 326 provided with a drum contact lug 329 and arranged to contact in returned position with a stop 324.

The lever 326 is provided with a pawl 336 which cooperates with a cam surface 334 formed on a bracket 335 secured as by welding to the shoe 312. Pivoted on the lever 326 is an auxiliary lever 340 provided with a lug 342 and with an extension 344. The bracket 335 is provided also with teeth 346 arranged to cooperate with a pawl 348 pivoted on a lever 350. The lever 350 is pivoted as at 352 on the shoe 312 and normally pivotally contacts as at 354 with the shoe 314. The lever 350 is provided with a lug 356 which cooperates with the extension 344 of the lever 340.

In normal brake application without wear of the lining the levers 326 and 350 maintain the same position relative to the shoe 312. The lug 327 of the lever 326 contacts the stop 324 to maintain the proper shoe clearance. The braking torque of the shoe 312 is transmitted through the lever 350 to the shoe 314 at 354 to apply the shoe 314. Both shoes anchor in one direction of braking through the shoe 314, and in the other direction of braking through the shoe 312. When the lining wears the lug 329 contacts with the drum before the lining 313 and thus moves the lever 326 about its pivot relative to the shoe 312 and moves the pawl 336 relative to the cam surface 334. When the brake is released and the shoe 312 returns the lug 342 contacts the stop 324 before the lug 327 does and thus moves the auxiliary lever 340. This causes the extension 344 to contact the lug 356 and while the brake is being released moves the lever 350 about its pivot causing the pawl 348 to ride over one of the teeth 346, thus lengthening the connection between the shoes 312 and 314 at 352 and 354.

Figure 5:
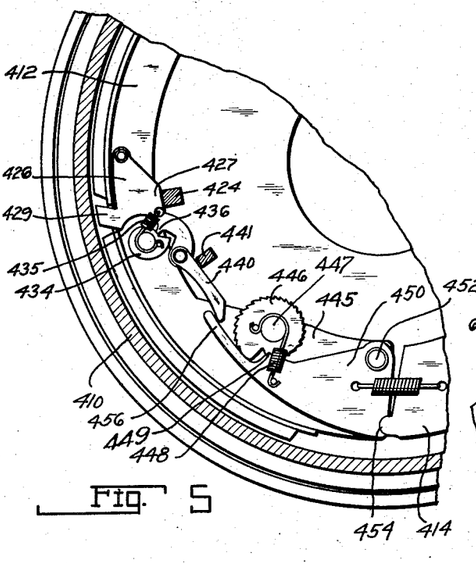
Figures 5 and 6 are also fragmentary views similar to Figure 4 and showing additional embodiments of servo brakes arranged to act quite similar to the embodiment shown in Figure 5.

In the brake shown in Figure 5 there is a drum 410 with which there are associated brake shoes 412 and 414. Pivotally mounted on the shoe 412 is a lever 426 having a drum contact lug 429 and a stop contacting base 427, the latter being adapted to contact with the stop 424. The lever 426 also has a lug 436 arranged to contact with the cam face of a rotatable cam 434. The cam 434 is normally held in contact with the lug 436 by a spring 435 which is also arranged to exert a pull on the cam 434 tending to rotate it in a clockwise direction.

As stated above, the cam is normally held in contact with the lug 436, but when due to lining wear the lever 426 moves into contact with the drum prior to lining contact, the lever 426 is rotated counterclockwise and the lug 436 moves away from the cam 434. Thereupon the cam 434 is rotated by the spring 435 to take up the clearance between the cam and the lug. Thus the lever 426 is adjusted relative to the shoe 412 and constant clearance is maintained. The lever 426 also has pivoted thereon an auxiliary lever 440 which is arranged to contact with an auxiliary stop 441 and with an extension 456 formed on a lever 450. The lever 450 is pivoted at 452 and pivotally abuts against the shoe 414 at 454. A cam 446 mounted on a pivot 447 carried by an extension 445 of the web of the shoe 412 is normally urged into contact with the lever 450 by a spring 448 and serves a function similar to that of the cam 434 in maintaining the position of the lever 450 and in adjusting the lever 450 to extend the connection between the shoes to compensate for lining wear. The lever 450 has a pawl tooth 449 engaging ratchet teeth on the edge of cam 446.

Figure 6:
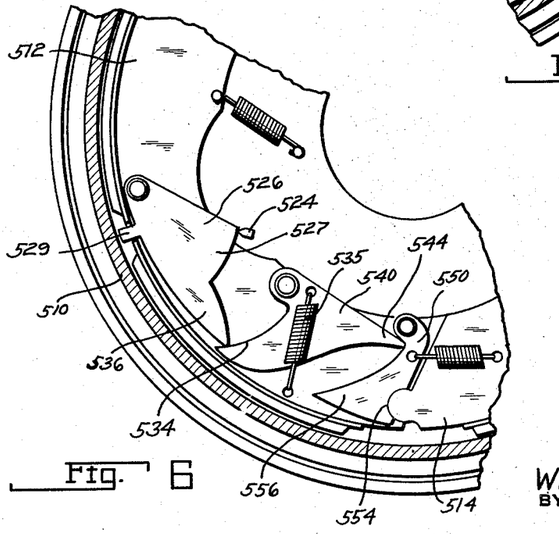

In the brake shown in Figure 6, the drum 510 is associated with shoes 512 and 514, the shoe 512 having pivoted thereon levers 526, 540, 550. The lever 526 is formed with a drum contacting lug 529, with a cam face 527 adapted to contact with a stop 524 and with an extension 536. The lever 540 is provided with a cam face 534 with which the extension 536 contacts and with an extension 544 which is arranged to contact with the cam face 556 of the lever 550. The lever 550 also pivotally abuts against the shoe 514 as at 554.

Figure 7:
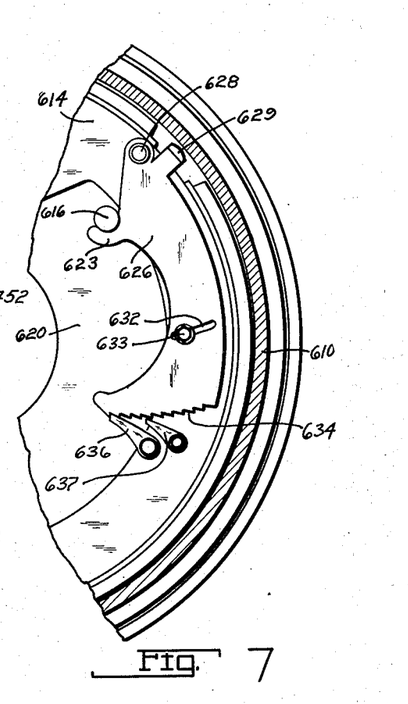
Figure 7 is a fragmentary sectional view corresponding to a portion of Figure 3 and also showing another form of servo brake as another embodiment of my invention.

In the arrangement shown in Figure 7, there is provided a drum 610 having a pair of shoes, each of which is similar to the shoe 14. The backing plate 620 carries a pair of anchors such as the anchor 616. In the counterclockwise direction of rotation of the drum, both shoes anchor on one of the anchors 616 and in clockwise rotation of the drum both shoes anchor on the corresponding anchor on the opposite side of the brake. The shoe 614 has pivoted thereon as at 628 a lever 626 having a drum contact lug 629 and an anchor contact lug 623, which is formed with a guide slot 632 through which there extends a guide bolt 633. It is also formed with teeth 634 with which pawls 636 and 637 are arranged to cooperate. Application of the brake when the opposite shoe is anchored will, if wear has occurred on the lining, shift the lever 626 to make the desired adjustment.

Figures 8, 10:
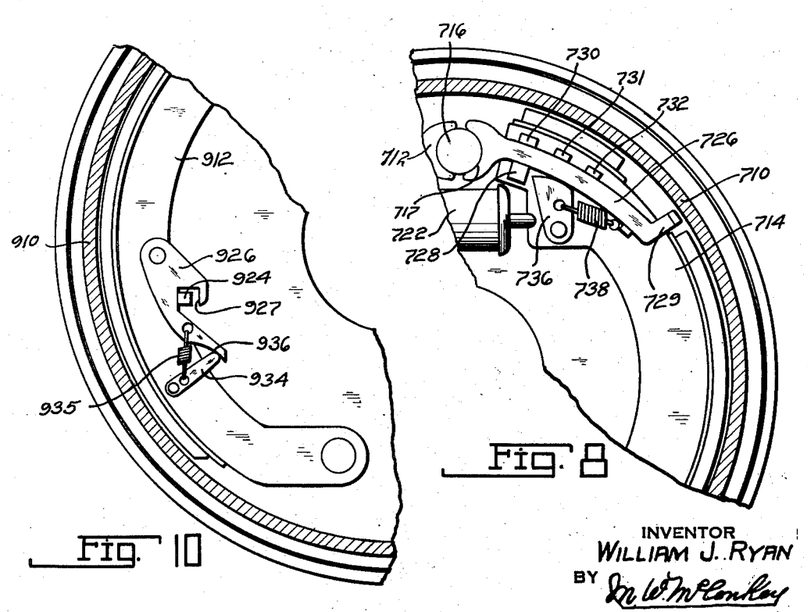
Figure 8 is a fragmentary sectional view of another brake illustrating my invention, being of the servo type and functioning similarly to the embodiment shown in Figure 7.
Figures 9, 10, and 11 are sectional views of brakes illustrating further embodiments of my invention, these arrangements being designed for use on brakes of the same general type as shown in Figure 1, but also being fitted for use on servo brakes of the type shown in Figure 3.

In the arrangement shown in Figure 8 the drum 710 is arranged to cooperate with a pair of shoes 714 and both of these shoes are arranged to anchor on a single anchor 716 arranged between their ends. A hydraulic wheel cylinder actuator 722 is arranged to spread the shoes apart to apply them to the drum. The right-hand shoes 714 is provided with guide lugs 728, 730, 731 and 732 between which a bar 726 is arranged to slide. The bar 726 is provided with a drum contact lug 729 and with an anchor receiving recess 717. A friction pawl 736 provided with a spring 738 locks the bar 726 against movement in one direction relative to the shoe 714, but allows the bar to be moved by drum contact, when the shoe carrying it is the unanchored shoe, to effectively lengthen the shoe when the lining has been worn.

Figure 9:
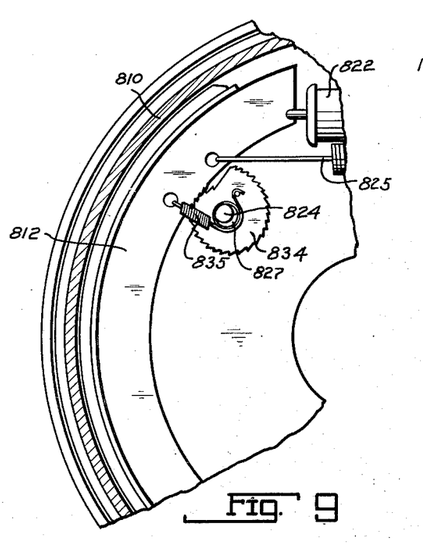

In the arrangement shown in Figure 9, the drum 810 is arranged to cooperate with shoes such as the shoe 812, the shoes being applied by a wheel cylinder actuator 822 and being withdrawn from drum contact when released by a spring 825. A cam 834 connected with the shoe 812 by a spring 835 is provided with an oversize hole 827 through which there extends the pin 824 secured to the backing plate. In ordinary application of the brake, the cam 834 is held in contact with the shoe 812 by the spring 835 and moves with the shoe. However, when the lining becomes worn, the pin 824 contacts the inner side of the hole 827 and the shoe is then moved away from the cam. Thereupon the spring 835 rotates the cam to take up the slack and a constant drum clearance is thus maintained.

In the arrangement shown in Figure 10, the drum 910 is associated with a pair of shoes such as the shoe 912. Mounted on the shoe 912 is a lever 926 having a cam face 936 arranged to contact with a friction pawl 934 also pivoted on the shoe 912. The lever 926 is formed with a slot 927 within which is positioned a return stop 924. Application of the shoe 912 to the drum normally carries with it the lever 926 and the return position of the shoe is determined by the contact of the stop 924 with the slot 927. However, when the lining becomes worn, application of the shoe to the drum causes a movement of the lever 926 relative to the shoe by reason of the contact of the lug 924 with the opposite side of the slot and the position of the lever 926 is thus adjusted to maintain constant drum clearance. The friction pawl 934 is moved by the spring 935 to lock the lever 926 in its adjusted position.

Figure 11:
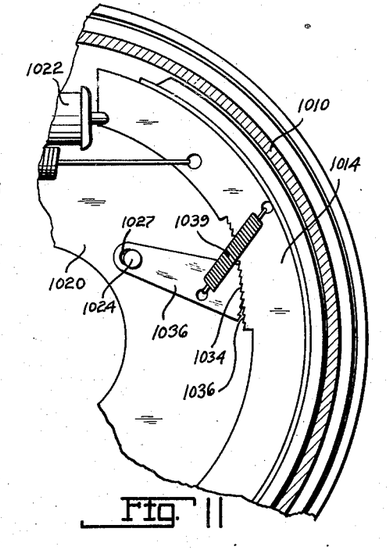

In the arrangement shown in Figure 11 the drum 1010 is provided with shoes such as the shoe 1014 which are arranged to be applied by a hydraulic wheel cylinder actuator 1022. The backing plate 1020 is provided with a pin 1024 which extends through a slot 1027 in a lever 1026 which is formed with teeth 1034 which cooperate with teeth 1036 formed on the web of the shoe 1014. The lever 1026 is also connected to the shoe 1014 by a spring 1039.

Figure 12:
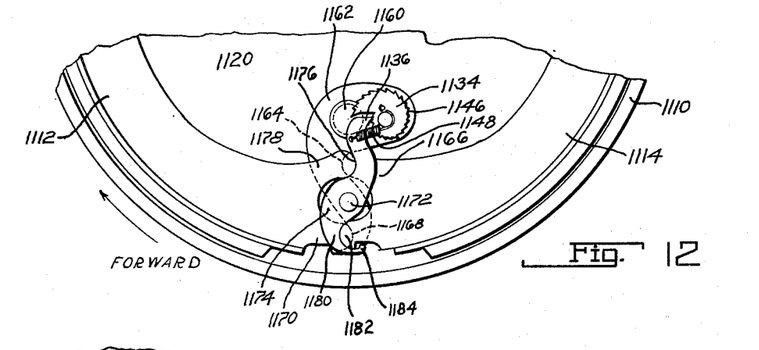
Figure 12 is a fragmentary sectional view of a brake illustrating my invention as applied to a brake of the servo type shown in Figure 3, having means for reducing the force of the anchoring torque used as applying force for the secondary shoe.

In the arrangement shown in Figure 12 the drum 1110 is associated with shoes 1112 and 1114. This brake is of the servo type and both shoes are arranged to anchor on one or the other depending upon the direction of braking, the same as described for shoes 212 and 214 shown in Figure 3. In forward braking in which, as shown, the drum is rotating in a clockwise direction, both shoes anchor through the shoe 1112 on an anchor, not shown, but which may be the same as the anchor 216 in Figure 3, associated with said shoe. The shoe 1114 is moved into drum contact by any suitable conventional means, not shown, which may be a wheel cylinder such as the wheel cylinder 22 shown in Figure 1.

The movement of the shoe 1114 is transmitted to the shoe 1112 to apply the shoe 1112 to the drum and the anchoring torque of the shoe 1114 is absorbed by this transmission and in part is transmitted through the shoe 1112 to the anchor. I have provided means for transmitting part of the anchoring torque of the shoe 1114 to the shoe 1112 and for converting and utilizing this part of this force as applying force for the shoe 1112, the connection between the shoes being so arranged as to absorb part of the force and transmit the same directly to the backing plate and thereby reduce the force acting on the shoe 1112 so that the braking action of the two shoes may be more nearly uniform. Secured to the backing plate 1129 is a pin 1160 on which there is pivoted an S-shaped lever 1162. The lever 1162 has a shoe contact portion 1164 arranged to contact with an extension 1166 formed on the end of the shoe 1114 and is also formed with a shoe contact portion 1168 facing in the opposite direction from the contact portion 1164 and arranged to contact with an extension 1170 formed on the shoe 1112.

Pivoted on the lever 1162 as at 1172 is an auxiliary S-shaped lever 1174 formed with a shoe contact portion 1176 with which an extension 1178 formed on the shoe 1112 is arranged to contact and also formed with a shoe contact portion 1180 facing in the opposite direction from the contact portion 1176 and with which an extension 1182 formed on the shoe 1114 is arranged to contact. The lower end of the auxiliary lever 1180 is formed with a lug 1184 which is arranged at times to contact with the right hand edge of the extension 1182 hook-shaped.

Mounted on the lever 1162 at its upper end is a cam 1134 having teeth 1146 arranged to contact with the pointed upper end 1136 of the auxiliary lever 1174. A spring 1148 connects the cam 1134 with the auxiliary lever 1174. During normal brake application in the forward direction the shoe 1114 is applied to the drum and rotation of the drum moves the shoe 1114 in a clockwise direction. The extension 1176 acting on the portion 1164 of the lever 1162 causes that lever to pivot on the pin 1160 and the portion 1168 contacts with the extension 1170 to move the shoe 1112 to drum contact. Due to the arrangement of the lever, the shoe movement of the shoe 1112 is greater than the movement of the shoe 1114 and the applying force is less than the force exerted by the shoe 1114, the remainder of the thrust from the shoe 1114 being transmitted through the pin 1160 to the backing plate.

Normally the lever 1174 and the cam 1134 move as a unit with the lever 1162. In this movement a slight clearance between the lug 1184 and the extension 1182 is not completely taken up. If, however, due to wear of the lining this clearance is taken up, the lug 1184 will contact with extension 1182 and will retard the movement of the auxiliary lever 1174, thus moving the point 1136 out of contact with the teeth 1146 and thereupon the spring 1148 will rotate the cam 1134 and adjust the length of the connection between the two shoes so as to compensate for lining wear. In reverse braking, the shoe 1112 anchors at 1176 on the lever 1174, and the lower end of lever 1174 transmits part of the force from shoe 1112 to the shoe 1114 as an applying force. The remainder of the anchoring thrust from the shoe 1112 is transmitted from the lever 1174 through the pivot 1172 and the point of engagement with the cam 1134 to the lever 1162, and thence through the pivot 1160 to the backing plate. The two levers 1162 and 1174, as they are swung relatively to each other when adjustment takes place as described above, in effect form a single lever whose width increases as successive adjustments are made.

Figure 13:
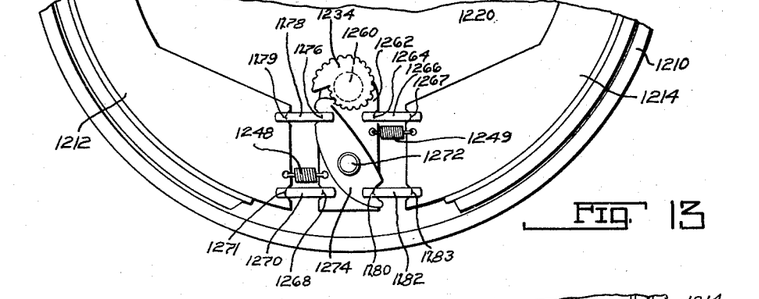
Figure 13 is a sectional view similar to Figure 12 showing a slight modification thereof.

In the arrangement shown in Figure 13 the drum 1210 is associated with shoes 1212 and 1214 which are of the servo type similar to that shown in Figure 12. Mounted on the backing plate 1220 by means of a pin 1260 is a lever 1262 formed with slots 1264 and 1268. Slotted pins 1266 and 1270 are associated with the slots 1264 and 1268 respectively. The pins 1266 and 1270 are formed with slots at each end and the opposite slotted ends from those associated with the lever 1262 are associated respectively with slots 1267 and 1271 formed respectively in the shoes 1214 and 1212.

Pivoted at 1272 on the lever 1262 is an auxiliary lever 1274 formed with slots 1276 and 1280 which are associated with slotted pins 1278 and 1282 respectively. The opposite slotted ends of the pins 1278 and 1282 fit over respectively slots 1179 and 1283 formed in the shoes 1212 and 1214 respectively. The lever 1262 is connected with the shoe 1212 by a spring 1248 and with the shoe 1214 by a spring 1249. Pivoted on the pin 1260 is a toothed cam 1234 which is arranged to be adjusted manually from the outside of the backing plate.

In forward braking, shoe 1214 swings lever 1262 to the left, part of its anchoring force acting as an applying force through lever 1262 on shoe 1212, and the remainder being transmitted to the backing plate through the pivot 1260. In reverse braking the shoe 1212 swings lever 1274 (and with it the lever 1262) to the right, part of its anchoring force being utilized as an applying force acting at 1283 on the shoe 1214 and the remainder being transmitted to the backing plate. Adjusting the cam 1234 in effect increases the width of the connection consisting of the levers 1274 and 1262, which act as a unit in the normal operation of the brake.

Figure 14:
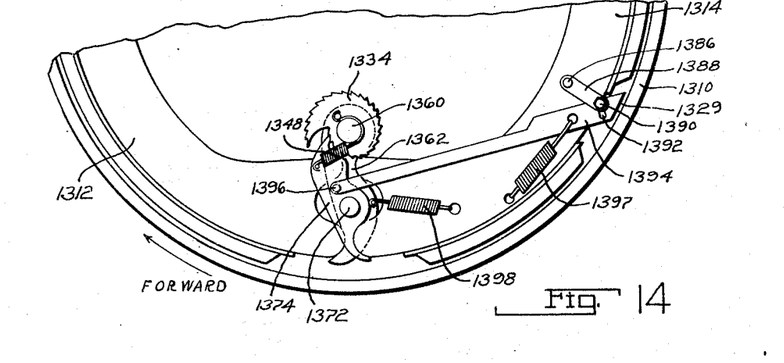
Figure 14 is a fragmentary sectional view of a brake similar to the brake shown in Figures 12 and 13 but provided with a drum contact member to prevent over-adjustment.

In the arrangement shown in Figure 14, the drum 1310 is associated with shoes 1312 and 1314 in a type of brake similar in most respects to that shown in Figure 12. The lever 1362 pivoted on the pin 1360 and the auxiliary lever 1374 pivoted at 1372 on the lever 1362 correspond essentially to the S-shaped levers shown in Figure 12. The cam 1334 connected to the lever 1374 by the spring 1348 corresponds essentially to the cam 1134. However, no lug similar to the lug 1184 is provided but I have provided different means for automatically adjusting the connection between the two shoes to take up clearance due to lining wear.

Mounted on the shoe 1314 as at 1386 is a supporting link 1388 which carries a pin 1390 extending through a slot 1392 in a link 1394 and thus supports the link at one end. The opposite end of the link 1394 is pivotally connected as at 1396 to the auxiliary 1384. A spring 1397 connected to the link 1394 and to the shoe 1314 normally maintains the link 1394 in the position shown. The outer end of the link 1394 is formed with a drum contact surface 1329 so that when the shoe is moved into drum contact this portion 1329 approaches the drum.

When the lining becomes worn the portion 1329 contacts with the drum and when the lining is worn sufficiently and the drum is rotating in a clockwise (forward) direction moved to the left as shown in Figure 14 and thus moves the auxiliary lever 1374 about its pivot 1372 and allows the cam 1334 to be adjusted by the spring 1348, thus adjusting the connection between the shoes and taking up the clearance for lining wear. A spring 1398 connects the shoe 1314 to the lever 1362 to aid in centering the shoes when the brake is released.

It is to be understood that the above-described embodiments of my invention are for the purpose of illustration only and various changes may be made therein without departing from the spirit and scope of my invention.

I claim:

1. A brake comprising, in combination, a brake drum, an anchor, a brake friction member having said anchor arranged at one end thereof, anchor means mounted on said friction member and having a part arranged to contact with said drum and having another part shifted lengthwise of the shoe by the pressure of the drum on the first part to compensate for wear of the brake and which is arranged to transmit the braking torque of the friction member to said anchor, and means for releasably holding said means in adjusted position relative to the friction member.

2. A brake as defined by claim 1, in which said friction member comprises two shoes, one of which anchors on said anchor through said anchor means when the drum is turning in one direction and the other of which anchors directly on said anchor when the drum is turning in the other direction.

3. A brake comprising, in combination, a drum, a pair of shoes associated therewith and arranged to anchor upon one shoe in one direction of rotation and upon the other shoe in the opposite direction of rotation, a backing plate, a lever pivoted on said backing plate and having a thrust connection with both shoes and arranged to transfer force from one shoe to the other in one direction of rotation, and an auxiliary lever pivoted on the first named lever and having separate thrust connections with both shoes and arranged to cooperate with the first named lever to transfer force from the second named shoe to the first named shoe in the opposite direction of rotation.

4. A brake comprising, in combination, a drum, a pair of shoes associated therewith and arranged to anchor upon one shoe in one direction of rotation and upon the other shoe in the opposite direction of rotation, a backing plate, a member mounted on said backing plate and having a thrust connection with both shoes and arranged to transfer force from one shoe to the other in one direction of rotation, an auxiliary member associated with the first named member and having separate thrust connections with both shoes and arranged to cooperate with the first named member to transfer force from the second named shoe to the first named shoe in the opposite direction of rotation, and means for adjustably connecting said members.

5. A brake comprising, in combination, a drum, a pair of shoes associated therewith and arranged to anchor upon one shoe in one direction of rotation and upon the other shoe in the opposite direction of rotation, a backing plate, a lever pivoted on said backing plate and having a thrust connection with both shoes and arranged to transfer force from one shoe to the other in one direction of rotation, an auxiliary lever pivoted on the first named lever and having separate thrust connections with both shoes and arranged to cooperate with the first named lever to transfer force from the second named shoe to the first named shoe in the opposite direction of rotation, and means for angularly adjusting the levers relatively to each other.

6. A brake comprising, in combination, a drum, a pair of shoes associated therewith and arranged to anchor upon one shoe in one direction of rotation and upon the other shoe in the opposite direction of rotation, a backing plate, a lever pivoted on said backing plate and arranged to transfer force from one shoe to the other in one direction of rotation, an auxiliary lever pivoted on the first named lever and arranged to cooperate with the first named lever to transfer force from the second named shoe to the first named shoe in the opposite direction of rotation, and means operated automatically in accordance with lining wear for adjusting said levers relatively to each other.

7. A brake comprising, in combination, a drum, a pair of shoes associated therewith and arranged to anchor upon one shoe in one direction of rotation and upon the other shoe in the opposite direction of rotation, a backing plate, a lever pivoted on said backing plate and arranged to transfer force from one shoe to the other in one direction of rotation, an auxiliary lever pivoted on the first named lever and arranged to cooperate with the first named lever to transfer force from the second named shoe to the first named shoe in the opposite direction of rotation, and means operated automatically in accordance with lining wear for adjusting said levers relatively to each other, said means being ineffective to adjust the position of the levers for clearance due to expansion of the drum.

8. A brake comprising, in combination, a drum, a primary shoe and a secondary shoe associated therewith and arranged to anchor upon the secondary shoe in one direction of rotation and upon the primary shoe in the opposite direction of rotation, a backing plate, a lever pivoted on said backing plate and having a thrust connection with both shoes and arranged to transfer force from the primary shoe to the secondary shoe in one direction of rotation and an auxiliary lever pivoted on the first named lever and having separate thrust connections with both shoes and arranged to cooperate with the first named lever to transfer force from the secondary shoe to the primary shoe in the opposite direction of rotation.

9. For a brake an adjusting device comprising a cam wheel mounted on a pivot, a member movable relative to said pivot and contacting the cam surface of said wheel, a spring connected at one end to said movable member and at the other end to said cam wheel and passing intermediate its ends around said pivot whereby the spring tends to rotate said cam wheel about said pivot, but normally by reason of the contact with said cam wheel, said movable member prevents rotation of said cam wheel.

10. For use in a brake an adjusting device comprising a cam wheel formed with a toothed cam surface and mounted on a pivot, a member movable relative to said pivot and having a tooth cooperating portion contacting the toothed cam surface of said wheel, a spring connected at one end to said movable member and at the other end to said cam wheel and passing intermediate its ends around said pivot whereby the spring tends to rotate said cam wheel about said pivot but normally the contact between said cam wheel toothed surface and movable member prevents rotation of said cam wheel.

11. A brake comprising a drum and a pair of shoes, a lever device adjustably connecting the shoes and movable to expand the shoes to take up for wear, and a lever mounted on one of the shoes and which is engageable with the drum and is shifted by the drum in case of wear and which is provided with means interengaging with said lever device to operate it.

12. A brake comprising a drum and a pair of shoes, a lever pivoted on one shoe and engaging the other shoe and which adjustably connects the shoes and which is movable to expand the shoes to take up for wear, and a second lever mounted on one of the shoes and which is engageable with the drum and is shifted by the drum in case of wear and which is provided with means interengaging with said first lever to operate it.

13. A brake comprising a drum and a pair of shoes, a lever device connecting the shoes and which is operable to expand the shoes to take up for wear, and a member mounted on one shoe and which is shiftable relatively to said shoe in case of wear by direct engagement with the drum and which has means for so operating the lever device when it is shifted relatively to its shoe.

14. A brake comprising a drum and a pair of shoes, a lever device connecting the shoes and which includes two levers mounted on a pivot and a cam connecting the levers and which cam is operable to expand the shoes to take up for wear, and a member mounted on one shoe and which is shiftable relatively to said shoe in case of wear by direct engagement with the drum and which has means for causing operation of the cam and so operating the lever device to adjust the brake when said member is shifted relatively to its shoe.

15. A brake comprising a drum and a pair of shoes, a lever device connecting the shoes and which is operable to expand the shoes to take up for wear, and a member mounted on one shoe and which is shiftable relatively to said shoe in case of wear by direct engagement with the drum and which has means for so operating the lever device when it is shifted relatively to its shoe, said device comprising a lever pivoted on one shoe and engaging the other shoe.

16. A brake comprising a shoe and a drum, a backing plate having a fixed anchor for the shoe, and means compensating automatically for wear of the shoe including a member shiftably mounted on the shoe and which is shifted relatively to the shoe in case of wear by direct engagement with the drum, together with a lever pivotally mounted on the shoe and moved by the shifting of said member to compensate for wear of the shoe.

17. A shoe for use in a brake having mounted thereon wear-compensating means including a member shiftable by direct engagement with a brake drum engaged by the shoe together with a lever pivoted on the shoe, and means operated by said member to move the lever angularly on the shoe.

18. A shoe for use in a brake having mounted thereon wear-compensating means including a member shiftable by direct engagement with a brake drum engaged by the shoe together with a lever pivoted on the shoe and a cam device operated by said member to move the lever angularly on the shoe.

19. A brake comprising shoes, a drum, means for adjusting for wear which is shiftable to increase the effective length of the shoes and which includes a part directly engageable with the drum and through which the drum operates said means, a pivoted member movable to maintain said means in adjusted position without preventing further adjustment, and a spring connected to the pivoted member and urging it in a direction to maintain the adjusted position.

WILLIAM J. RYAN.